May 9, 1967

SHINE YASUOKA ETAL 3,319,104

STARTER DEVICE FOR A D.C. ELECTRIC MOTOR

Filed Oct. 3, 1963

INVENTORS
Shine Yasuoka
Yutaka Tanaka
Kaoru Sasabe

By Stevens, Davis, Miller & Mosher
ATTORNEYS

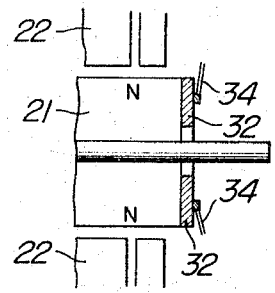
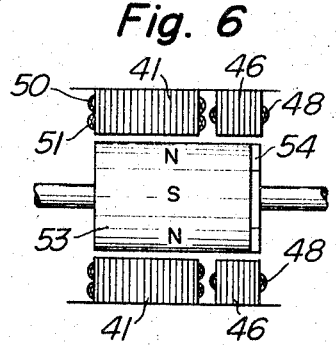
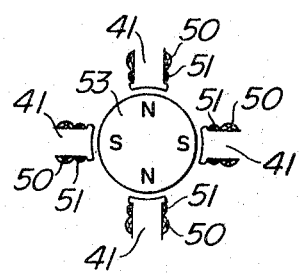
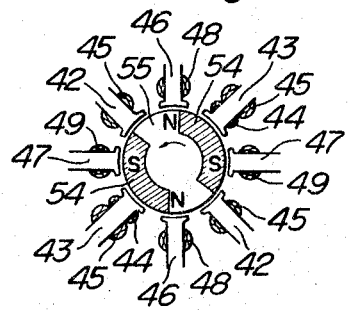
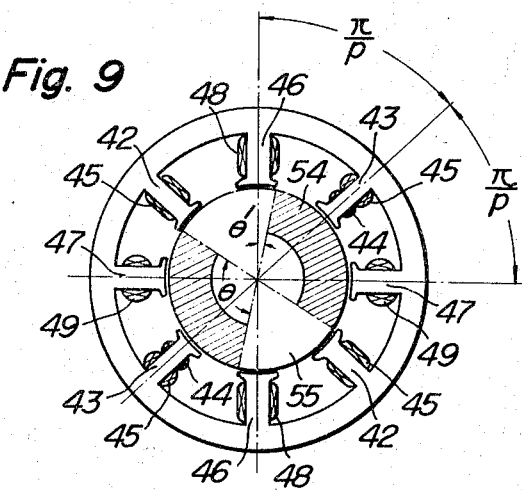
INVENTORS
Shine Yasuoka
Yutaka Tanaka
Kaoru Sasabe
By Stevens, Davis, Miller + Mosher
ATTORNEYS INVENTORS
Shine Yasuoka
Yutaka Tanaka
Kaoru Sasabe
By Stevens, Davis, Miller & Mosher
ATTORNEYS

United States Patent Office 3,319,104
Patented May 9, 1967

3,319,104
STARTER DEVICE FOR A D.C. ELECTRIC MOTOR
Shine Yasuoka, Toyonaka-shi, Yutaka Tanaka, Kobe, and Kaoru Sasabe, Ikeda-shi, Japan, assignors to Matsushita Electric Industrial Co., Ltd., Osaka, Japan, a corporation of Japan
Filed Oct. 3, 1963, Ser. No. 313,616
Claims priority, application Japan, Oct. 25, 1962, 37/47,723; Mar. 13, 1963, 38/14,404; June 18, 1963, 38/32,172
7 Claims. (Cl. 313—138)

This invention relates to a starter device for a D.C. electric motor, and more particularly to such a starter device having driving coils composed of coils, of a switching circuit in which transistors or semiconductors having control electrodes are employed for switching elements, and an armature including a permanent magnet whereby the armature is driven continuously by the electromagnetic force acting between a magnetic field produced by electric current flowing through the driving coils, under the action of the switching circuit, and the permanent magnet armature.

It is the primary object of the invention to provide a starter device for a D.C. electric motor which makes it possible to self-start the motor easily and dependably by producing a large starting torque in the D.C. motor, with the motor having driving coils composed of coils disposed in a switching circuit using switching elements and an armature of the motor consisting of a permanent magnet.

According to the present invention, there is provided a starter device characterized in controlling current flow through a starter coil by detecting the magnetic polarity of an armature of a permanent magnet in respect to a stator, followed by terminating the operations by means for detecting the magnetic polarity of the armature and a device for converting current flowing through the starter coil, after a definite time interval from starting of the armature in a predetermined direction or after the armature has gained a definite revolution rate.

The present invention will now be described in detail in conjunction with the accompanying drawings which illustrate some preferred embodiments thereof and in which:

FIG. 5 shows a longitudinal section of the principal part of the electric motor shown in FIG. 4;

FIG. 6 shows a schematic longitudinal section of still another embodiment of a D.C. electric motor according to the present invention;

FIG. 7 shows a left-side elevation of the apparatus shown in FIG. 6;

FIG. 8 shows a right-side elevation of the apparatus shown in FIG. 6;

FIG. 9 is an enlarged fragmentary view of the apparatus shown in FIG. 8;

FIGS. 14a and 6 show perspective views of an armature and an electromagnetic brush means, respectively, of the D.C. motor shown in FIG. 12.

Figure 1:
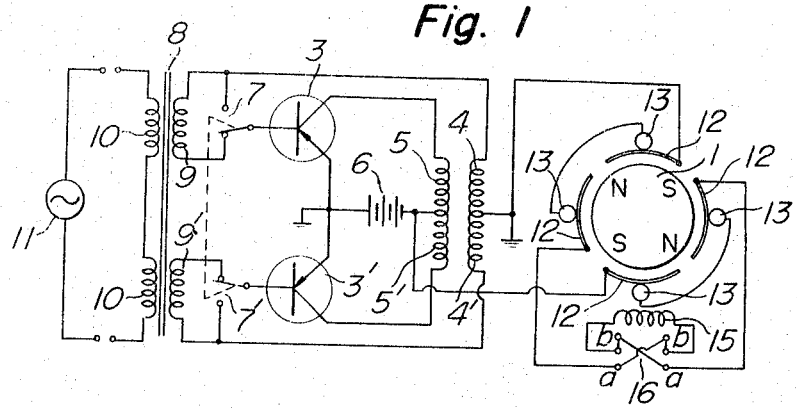
FIG. 1 shows an electrical wiring diagram of an embodiment of a starter device for a D.C. electric motor according to the present invention.
Figure 2:
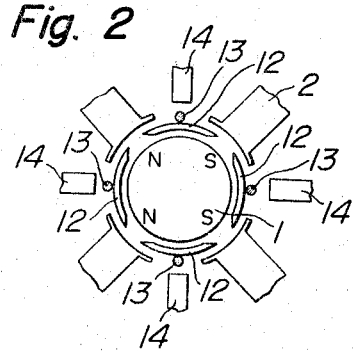
FIG. 2 is a schematic plan view of the principal part of the electric motor shown in FIG. 1.
Figure 3:
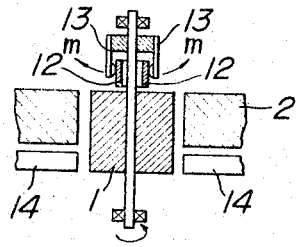
FIG. 3 shows a longitudinal section of the principal part shown in FIG. 2.

Referring to the drawings, particularly to FIGS. 1, 2 and 3 thereof, a D.C. electric motor having a starter device according to the instant invention has a permanent magnet armature 1 and main field poles 2, each having a field coil. The field coil is composed of base coils 4 and 4' and collector coils 5 and 5' of a switching circuit having transistors 3 and 3' connected in push-pull relation. The collector coils 5 and 5' are connected through a D.C. power source 6 between the emitters and the collectors of the transistors 3 and 3', respectively. The base coils 4 and 4' are connected between the emitters and bases of the transistors 3 and 3', through switching contacts 7 and 7', respectively. Between the emitters and bases of the transistors 3 and 3' are also connected, through said switching contact 7 and 7', secondary windings 9 and 9', respectively, of a coupling transformer 8, to the primary of which is applied an external signal produced in a signal generator 11. The D.C. motor has commutators 12 fixedly secured to stators, brush means 13 rotating in sliding contact to the commutator 12 and fixed to the armature 1, and interpoles 14 which are disposed between the main field poles 2, 2 and about which is wound a starting coil 15. As shown in FIG. 1, the starting coil 15 is connected to the D.C. power source 6 through a switch 16, the commutators 12 and the brush means 13.

The commutators 12 and brush means 13 operate to convert the polarity produced in the interpoles 14 through controlling the current flow through the starting coil 15 wound around the interpoles 14 for the stators without feeding current to the armature as in the conventional D.C. motors. The brush means 13 rotate along with the armature 1 and clears the commutators 12 under the influence of centrifugal force in the direction shown by an arrow m in FIG. 3 to break the excitation of the interpoles 14 when the brush means 13 are rotating at a constant rate of speed.

Although description is made in conjunction with an embodiment having four interpoles by way of illustration, it is to be understood that one or more interpoles may be formed in adequately disposed relation to the main field poles, that they do not have to be arranged just at the middle points between the adjacent main field poles and that the interpoles may be separated from the brush means by means of an electromagnetic force produced through the intermediary of a relay instead of utilizing centrifugal force as described above at a constant rotational speed. Moreover, the main field poles and the interpoles may be formed either on the same stator or on separate stators individually.

When the above mentioned motor stops, poles N and S of the armature 1 nearly oppose the main field poles 2 and thus starting torque acting on the armature 1 is too low to start the motor even though the main field poles are magnetized if interpoles 14 are not provided.

Since the starter device according to the invention comprises the starting coil 15, if either of contacts a and b of the switch 16 is connected to the coil 15 when starting, energizing current flows from the D.C. power source 6 through the commutators 12 and the brush means 13 to the starting coil 15 to magnetize the interpoles 14. The armature 1 is started by torque which is the repulsion or attraction acting from the interpoles 14 on the armature 1 which has been at rest till then.

When the armature 1 starts, the brush means 13 rotates therewith, and as the commutators 12 are converted by their sliding contact with the brush means 13, the polarity of D.C. current impressed upon the starting coil 15 is reversed at a time interval of one fourth revolution of the armature 1 and thus the interpoles 14 are alternately magnetized in polarity so as to apply torque always to the armature 1.

Furthermore, since the direction of rotation of the armature depends which contact a or b of the switch 16 is connected to the starting coil 15 when starting, the direction of starting of the motor may be set either forward or backward.

When the speed of the armature 1 has been built up after starting, the brush means 13 clear the commutators 12 to break the energization of the auxiliary poles 14 and the armature does not have torque applied by the interpoles 14. At this instant, switching action of the transistors 3 and 3' is controlled by induced voltage across the base coils 4 and 4' by the rotation of the armature 1 and the main field magnetic pole is magnetized by an oscillating current flowing to the collector coils 5 and 5' and provides driving force for the armature 1 to continuously rotate.

If an external signal of appropriate frequency, if desired, is applied to the primary 10 of the coupling transformer 8, the armature 1 is synchronized into synchronous speed corresponding to the external signal frequency, and after then it is rotated synchronously following the change in the frequency of the external signal.

As described heretofore, according to the present invention, a D.C. motor having a permanent magnet armature provided with interpoles having a starting coil wound therearound and disposed between adjacent main field magnetic poles, and with commutators for converting synchronously with the rotation of the armature the polarity of voltage impressed upon said starting coils, the motor is started in a definite direction by magnetizing the interpoles under the action of the commutators, when starting, and the commutators being released after starting. Thus the above mentioned embodiment of a starter device according to the invention can provide large starting torque, does not require any complex starting mechanism, effects starting easily and reliably, and further the motor is not subject to any braking force or loss when it is driven at a constant rate of speed, as then the action of the interpoles vanishes perfectly which produces torque when starting.

Figure 4:
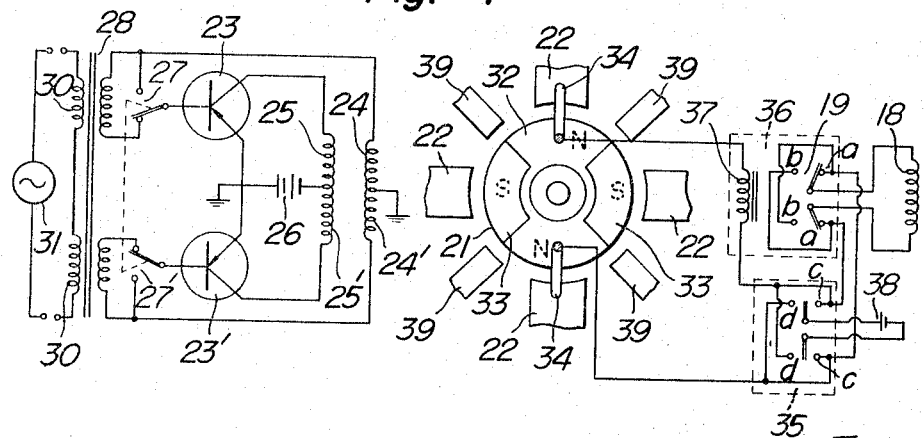
FIG. 4 shows another embodiment of a starter device for a D.C. electric motor according to the present invention.

Another embodiment of the present invention illustrated in FIGS. 4 and 5 will be now described. In the figures a D.C. motor comprises a permanent magnet armature 21 and main field magnetic poles 22 each having a field coil wound around it. The field coil comprises base coils 24 and 24' and collector coils 25 and 25' of a switching circuit which are connected to push-pull transistors 23 and 23'. The collector coils 25 and 25' are connected between the collectors and the emitters of the transistors 23 and 23', respectively, through a D.C. power source 26, and the base coils 24 and 24' are connected between the emitters and bases of the transistors 23 and 23' through switching contacts 27 and 27', respectively. Between the emitters and bases of the transistors 23 and 23' are connected secondary windings 29 and 29' of a coupling transformer 28 through said switching contacts 27 and 27', respectively, an external signal 31 being applied to the primary 30 of the transformer 28.

There are mounted contact plates 32 on an end surface of the armature 21. In the case of four pole motor as shown in FIG. 4, two such contact plates are angularly spaced through 180° on the magnetic pole of the armature and electrically connected to one another and insulating boards 33 are interposed between them. Brush means 34 contact slidingly with the contact plates 32 and the insulating boards 33. For the four-poled motor as shown in the figure there are two such brush means diametrically spaced through 180°, and a coil 37 of an electromagnetic relay 36 and a D.C. power source 38 are connected between the brush means through a switch 35.

A starting coil 18 is wound around an auxiliary pole 39 disposed between adjacent main field poles 22 and connected to the source 38 through a switching contact 19 of the relay 36. The contact plates 32 and the brushes 34 do not feed electric current to the armature as in a conventional D.C. motor, but operate to detect the position of the armature 21 in respect to the main field poles 22 and to convert exciting current through the starting coil 18 to start it. Under constant speed conditions, however, the brush means 34 is released from the contact plates 32 by means of a suitable mechanism to block energization of the interpoles 39.

Thus the rest position of the armature 21 with respect to the main field poles 22 is detected by whether there is contact between the brush means 34 or not and the electromagnetic relay 36 operates to turn on either contact a or b to convert the current through the starting coil 18 in accordance with the position of the armature 21. When the brush means 34 are in contact with the contact plates 32, the brush means are electrically connected to one another and when the brush means 34 are in contact with the insulating board 33, there is no electrical connection between the brush means 34.

Although in the above-mentioned embodiment the position of the armature is detected by means of the contact plates and brush means to operate the relay for converting current flowing through the starting coil, the position of the armature may be detected by means of a magnetic material such as a Hall element or parametron to operate the relay.

When the motor illustrated by the above mentioned embodiment rests, magnetic poles N and S of the armature 21 nearly opposes the main field poles 22. Therefore, if the interpoles 34 are not provided, the starting torque acting upon the armature is too low to start even though the main field poles 22 are magnetized. But since there the interpoles 39 are provided and they are magnetized by current flowing through the starting coil at the time of starting, high starting torque is applied to the armature 21 to facilitate starting.

Thus the contact 19 is connected to either a or b depending upon whether the coil 37 of the electromagetic relay 36 is energized or not. When a switch 35 is closed on either c or d at the time of starting, if the armature 21 rests at the position as shown in the figure, current flows through the coil 37 and if the armature rest at such a position that the brush means 34 is in contact with the insulating boards 33, current does not flow through the coil 37. Such change of the rest position varies the current flowing through the starting coil.

In this case, damage of the brushes and contact plates may be minimized because between the brushes and the contact plates flows the lower operating current of the relay but not high starting current which flows through the starting coil 18.

Thus with the starter device shown in FIG. 4, the rest position of the armature in respect to the main field magnetic poles is detected by means of a switching means to operate the relay, and the operation of this relay controls the direction of exciting current through the starting coil to start the motor. Current flowing through the starting coil is not controlled directly but through the relay by said switching means. Accordingly, the high starting magnetizing current does not flow through the switching means but the low operating current of the relay. Also, the starter device is simple in construction and highly effective in respect to providing high starting torque for the motor and making it possible to start the motor easily and reliably.

Another embodiment of the present invention will be described in conjunction with FIGS. 6 to 11. Although in this embodiment the permanent magnet armature has four poles, the embodiment can be made quite similarly with two poles or more than eight poles. The D.C. motor shown in FIGS. 6 to 11 has driving field poles 41, starting poles 42 shifted from the field poles 41 through an angle corresponding to an electrical angle of 90° and a signaling pole 43 which is shifted from the field poles 41 through an angle corresponding to an electrical angle of 90° and which has a coil 44 for applying a synchronizing signal of the motor and a starting coil 45 wound around the pole 41. Receiving poles 46 and 47 are shifted from the signaling pole 43 through an angle corresponding to an electrical angle $\pi/p$ ($p$ represents the number of magnetic poles of the armature) and have detecting coils 48 and 49 wound around the poles 46 and 47, respectively. The starting coil 45 is also wound around the starting pole 42 and a driving coil 50 and a starting coil 51 are wound around the driving field pole 41. In this embodiment, the signaling pole 45 is shifted from the driving field pole 41 through an angle corresponding to an electrical angle of 90°. The signaling pole 45 has also the starting coil 45 wound around it to operate as a starting pole. The driving coil 50 comprises coils $L_1$, $L_1'$, $L_2$ and $L_2'$ which are arranged in an oscillating circuit 52 including transistors $T_1$ and $T_2$.

An armature 53 is formed on its ends with the signaling pole 43, sections of high magnetic permeability which can oppose the receiving poles 46 and 47 and sections of low magnetic permeability disposed between the sections of high permeability. The sections of high permeability 54 are $$\left(\frac{3\pi}{p}-2\theta'\right)$$

radian long and the sections of low permeability are $$\left(\frac{\pi}{p}+2\theta'\right)$$

radian long, where $\theta'$ depends on conducting time length and excess time for magnetic conduction between the signaling pole 45 and the receiving poles 46 and 47, due to overlapping caused from the breadth of the poles 43, 46 and 47. $\theta'$ denotes the degree of compensation for adjusting the period of time during which the starting current is flowing. This compensation is provided because the magnitude of the signals cannot be caught exactly owing to the breadths of the poles or the gaps, when the sections of high permeability are positioned between the signaling pole and the receiving poles. Accordingly a bad effect impressed upon starting torque during rise and fall of the starting current is readily eliminated since the magnetic conduction time between the signaling pole 45 and the receiving poles 46 and 47 can be adjusted so as to coincide perfectly with mechanical positions of poles N and S of the armature by limiting voltages induced across the detecting coil 48 and 49 and we may make $\theta=0$.

Figures 10, 11:
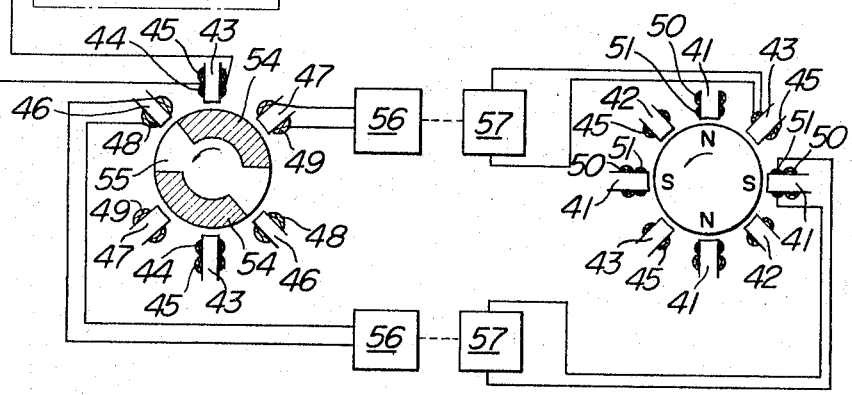
FIGS. 10 and 11 show circuit diagrams of the apparatus shown in FIG. 8.

Various electrical elements are connected in the manner as shown in FIGS. 10 and 11 in which an amplifying device 56 is adapted to amplify the received signal to discriminate the polarity and a switching device 57 controls the starting current.

In operation, assuming that the armature 53 rotates counter-clockwise from the position shown in FIG. 8, when the highly permeable sections oppose the coil 44 and the coil 49, these coils are coupled magnetically one to another and when the highly permeable sections do not oppose either of the coils 44 and 49, these coils are not coupled magnetically. The above consideration applies to the coils 44 and 48. Accordingly, the detecting coil 48 or 49 is alternately coupled and uncoupled with the coil 44 at an interval of rotation of $\pi/p$ radians of the armature 53 and couplings of the coils 48 and 49 with the coil 44 differ in phase by $\pi/p$ radians. A signal source K induces an output voltage across the coil 48 or 49 which is coupled with the coil 44, and the output voltage of the coil 48 or 49 is amplified by the amplifier 56 to operate the switching device to open and close. This amplified signal controls the current through the starting coils 45 and 51 to magnetize the armature so that it may be self-started. Thus the armature is rotated continuously through $\pi/p$ radians until one of the detecting coils 48 and 49 which was not coupled previously with the coil 44 is coupled magnetically with the coil 44 to operate the switching device 57 for magnetizing the starting coils 45 and 51 to apply further rotational force to the armature.

Although in the above mentioned embodiment nearly constant starting torque can be obtained irrespective of the rest position of the poles of the armature, as two starting coils 45 and 57 are provided having a phase difference of $\pi/p$ radians therebetween, if the rest position of the poles of the armature always opposes the driving poles 41, starting can be effected with only the starting coil 45.

In a starter device or driving device for such an electric motor, it is required to detect the rest position and magnetic polarity of the armature; mechanical structures, including electric contacts, employed for this purpose have encountered the difficulty of being easily damaged. In the embodiment shown in FIGS. 6 to 11, however, the signaling stationary pole and each receiving stationary pole are spaced by $\pi/p$ radian ($p$ is the number of poles of the armature) and $p/2$ highly permeable sections extending to a width of $3\pi/p$ radian each being spaced by $\pi/p$ radian are mounted on the armature. The position of the poles of the armature in respect to the stationary pole is determined by the conducting state and nonconducting state to the detecting coils of the receiving stationary poles of the signal applied to the signaling stationary pole corresponding the position of the highly permeable sections in respect to the stationary poles. The signal induced across the detecting coil of the receiving stationary pole effects a control of the direction of current flowing through the driving coil to drive the armature. Since the device does not include any mechanical structures such as contacts to detect the polarity and position of the poles of the armature, the device has advantages that damage of parts thereof is minimized and it can be driven reliably.

Figure 12:
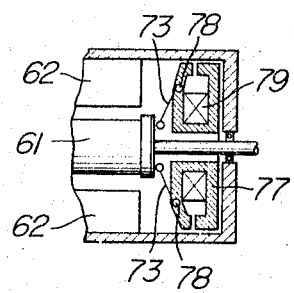
FIG. 12 shows a longitudinal section of the principal part of still another embodiment of a D.C. electric motor according to the present invention.
Figure 13:
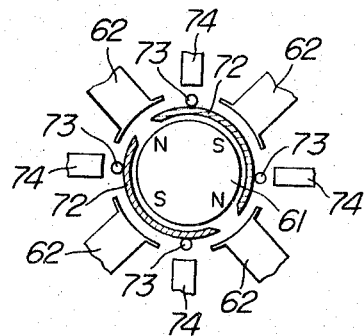
FIG. 13 shows a schematic plan view of the principal part of the D.C. motor shown in FIG. 12.
Figure 14:
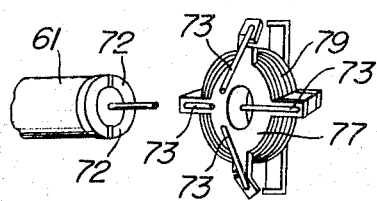
Figure 15:
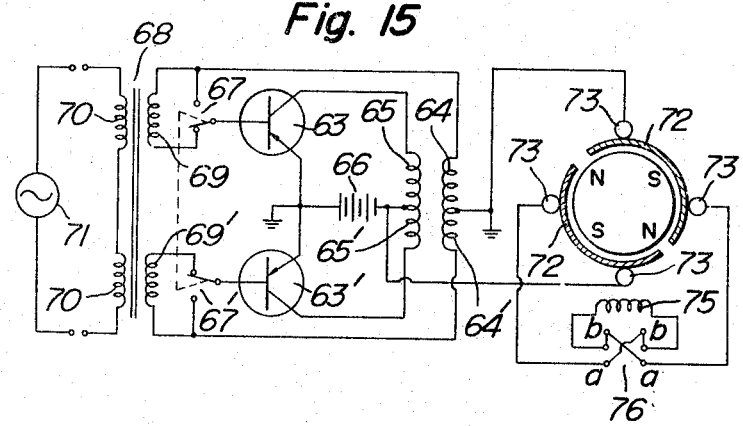
FIG. 15 is a circuit diagram of a starter device for the D.C. motor shown in FIG. 12.

The alternative embodiment shown in FIGS. 12 to 13 will be now described. In the figure, reference numeral 61 represents a permanent magnet armature and main field magnetic poles 62 have field coils wound therearound. The field coils comprises base coils 64, 64' and collector coils 65, 65' both connected in a switching circuit in which transistors 63, 63' are connected in push-pull relationships. The collector coils 65 and 65' are connected between the emitters and collectors of the transistors 63 and 63', respectively, through a D.C. power source 66. The base coils 64 and 64' are connected between the emitters and the bases of the transistors 63 and 63' through switching contacts 67 and 67', respectively. Secondary coils 69 and 69' of a coupling transformer 68 are also connected between the emitters and bases of the transistors 63 and 63' through the switching contacts 67 and 67', respectively, and an external signal 71 is applied across the primary coil 70 of the transformer 68. Commutators 72 are secured to the armature 61 and stationary brush means 73 are adapted to contact slidingly the commutators 72. Interpoles 74 are disposed between adjacent main field poles 62, 62' and have starting coils 75 wound therearound and the starting coils 75 are connected to the D.C. power source 66 through a switch 76, the commutators 72 and the brush means 73.

An electromagnet 77 is mounted on the stator and the brush means 73 are pivoted on the electromagnet 77 by means of shafts 78. When the electromagnetic coil 79 is energized, the ends of the brushes 78 are pulled by the electromagnet 77 to make the brush means 73 to contact with the commutators 72, and deenergization of the coil 79 separates the brush means 73 from the commutators 72.

The commutators 72 and the brush means 73 are adapted to control the direction of current flowing in the starting coil, wound around the interpoles 74 of the stators, to convert the polarity produced on the interpoles 74 but not to feed current to the armature as commutators and brushes of conventional D.C. motors do.

Although in the above mentioned embodiment four interpoles are employed, any number of interpoles may be employed in proper special relation to each other, and the interpoles need not necessarily be disposed just at the middle point between adjacent main field pole. The interpoles may be formed into the same stator as the main field pole or formed separately.

In the above mentioned D.C. motor, when it is at rest, magnetic poles N, S of the armature 61 nearly oppose the main field poles 62. Accordingly, if the motor is not provided with interpoles 74, the starting torque impressed upon the armature is too low for starting even when the main field poles 62 are magnetized.

Since, however, the above mentioned embodiment of a D.C. motor is provided with interpoles 74 having the starting coil 75 wound therearound, if the starting coil 75 is connected to either one of the contacts $a$ and $b$ of the switch 76 to energize the electromagnetic coil 79, the brush means 73 contacts the commutators 72 to cause energizing current to flow from the D.C. source 66 through the commutators 72 and the brush means 73 to the starting coil 75, to magnetize the interpoles 74. Thus torque due to repulsion or attraction is impressed by the interpoles 74 upon the armature which has been resting with its poles being disposed midway between adjacent interpoles 74. As the armature 61 is started, the brush means 73 is rotated with the armature 61 and the commutators 73 contacting the brush means 73 are commutated. Consequently, the polarity of D.C. voltage impressed upon the starting coil 75 is inverted at intervals of one fourth revolution, and thus the interpoles 74 are alternately magnetized into such polarities that they can always apply torque to the armature 61.

As the direction of rotation is determined by which of the contacts $a$ and $b$ is connected with the starting coil 75 upon starting, the motor may be started forward or backward as desired by setting the switch 70 appropriately.

If the energization of the electromagnetic coil 79 is cut off when the speed of the armature 61 has been built up after starting, the brush means 73 is separated from the commutators 72 to block the energization of the interpoles 74, and hence the interpoles 74 will not apply driving torque to the armature 61. Then the switching action of the transistors 63, 63′ is controlled by voltage induced upon the base coils 64, 64′ as the armature 61 is rotated. As a result, oscillating current through the collector coils 65, 65′ operates to magnetize the main field poles 62, 62′ to apply driving force to the armature 61 to continuously rotate it.

If at this stage, an external signal of an appropriate frequency, if desired, is applied across the primary winding of the coupling transformer 68, the armature 61 is synchronized into a synchronous speed corresponding to the frequency of the external signal, and after then the armature 61 is rotated synchronously in accordance with the variation in the frequency of the external signal.

As described above, the embodiment of starter device shown in FIGS. 12 to 15 is exceedingly superior in that its starting torque is high, any complex starting mechanism is not required, but still it can be operated easily and reliably and its not accompanied by any braking force or loss in stationary rotation as the effect of the interpoles completely vanishes which applies torque upon starting, by providing interpoles having a starting coil wound therearound between adjacent main field poles, forming commutators for converting polarity of voltage impressed upon the starting coil during rotation of the permanent magnet armature, making brush means contact with the commutators by the action of electromagnet to magnetize the interpoles by the action of the commutator upon starting, and releasing the brush means from the commutators by cutting off the magnetization of electromagnet.

As seen from the above description, the present invention relates to a starter device for a D.C. motor employing a permanent magnet armature wherein magnetic polarity of the armature to stators are detected, current flow through the starting coil is controlled corresponding to the detected polarity to start the motor in desired direction, operation of the starter device is terminated when a predetermined time has elapsed after starting or a predetermined speed has been built up. In addition to the above mentioned device for detecting the polarity of the armature, various other devices analogous thereto may be employed but have been omitted from the description. Further, for switching the starting current in accordance with the detection of the polarity of the armature, means serving both to detect the polarity of the armature and to switching the starting current or means for controlling the current through the starting coil in accordance with the polarity of the armature detected by a separate detecting device such as a relay may be employed. These have been also omitted from the description as they can be easily analogized from the above embodiments.

Moreover, detecting means for the polarity of the armature and means for converting current flowing through the starting coil may be combined in various manners, and integrated apparatus including means for releasing the starter device after starting may be made in various ways.

Although such apparatus obtained from combination were not illustrated particularly, it is intended that these are to be contained in the scope of the invention.

What we claim is:

1. A starter device for a D.C. motor having interpoles disposed between adjacent main field poles, said interpoles having a starting coil wound therearound, comprising means for detecting rotor position of a permanent magnet rotor in respect to said interpoles, means for converting the direction of current flowing through said starting coil in accordance with the detected rotor position to apply torque in a desired direction to said rotor, means for terminating operations of said means for detecting rotor position of said rotor and said means for converting the direction of current through said starting coil after said rotor has attained a predetermined rotational speed.

2. A starter device for a D.C. motor according to claim 1, comprising brush means, said means for rotor position of said rotor in respect to said interpoles comprising means for mechanically contacting commutators with said brush means and said means for converting the direction of current flowing through said starting coil being responsive to the commutating operation of said brush means and said commutators.

3. A starter device for a D.C. motor according to claim 1 comprising brush means, said means for detecting rotor position of said rotor in respect to said interpoles comprising means for mechanically contacting commutators with said brush means, said means for converting the direction of current flowing through said starting coil being responsive to the commutating operation of said brush means and said commutators, and centrifugal means for releasing said brush means from said commutators after starting.

4. A starter device for a D.C. motor according to claim 1 comprising electromagnetic means for releasing brush means for commutators after starting.

5. A starter device for a D.C. motor according to claim 1 comprising a switching device brush means, said brushes both detecting rotor position of said rotor with respect to said interpoles by mechanically contacting commutators and for switching said switching device in response to the detected rotor position and said means for converting the direction of current flowing through said starting coil being responsive to the action of said switching device.

6. A starter device for a D.C. motor according to claim 1 in which said means for detecting rotor position of said rotor in respect to said interpoles is responsive to a change in electromagnetic induction produced by making said electromagnetic inductance correspond to said rotor position, a switching means responsive to the detected position, and said means for converting the direction of current flowing through a starting coil being responsive to the switching operation of said switching means.

7. A starter device for a D.C. motor comprising a permanent magnet rotor, first interpoles disposed between adjacent main field poles, said interpoles having a starting coil wound therearound, second interpoles shifted 90 degrees electrically in the rotating direction of said rotor and having another starting coil wound therearound, means for detecting rotor position of said rotor, means for converting the direction of currents flowing through said starting coils to apply torque in a predetermined direction to said rotor, and means for terminating operations of said means for detecting rotor position of said rotor and of said device for converting the direction of current.

References Cited by the Examiner
UNITED STATES PATENTS

| | | | |
|---|---|---|---|
| 3,041,513 | 6/1962 | Reiches | 318—138 |
| 3,058,045 | 10/1962 | Feindt | 310—68 |
| 3,067,370 | 12/1962 | Quittner | 318—138 X |
| 3,109,980 | 11/1963 | Clason | 200—83 |
| 3,175,140 | 3/1965 | Hogan et al. | 318—138 |
| 3,185,910 | 5/1965 | Knapp | 318—138 |
| 3,200,315 | 8/1965 | Thompson | 318—138 |

ORIS L. RADER, *Primary Examiner.*

G. SIMMONS, *Assistant Examiner.*